April 7, 1925.
H. W. PARTLOW
1,532,340
HEAT CONTROL FOR INDUSTRIAL OVENS
Filed June 14, 1924
2 Sheets-Sheet 1
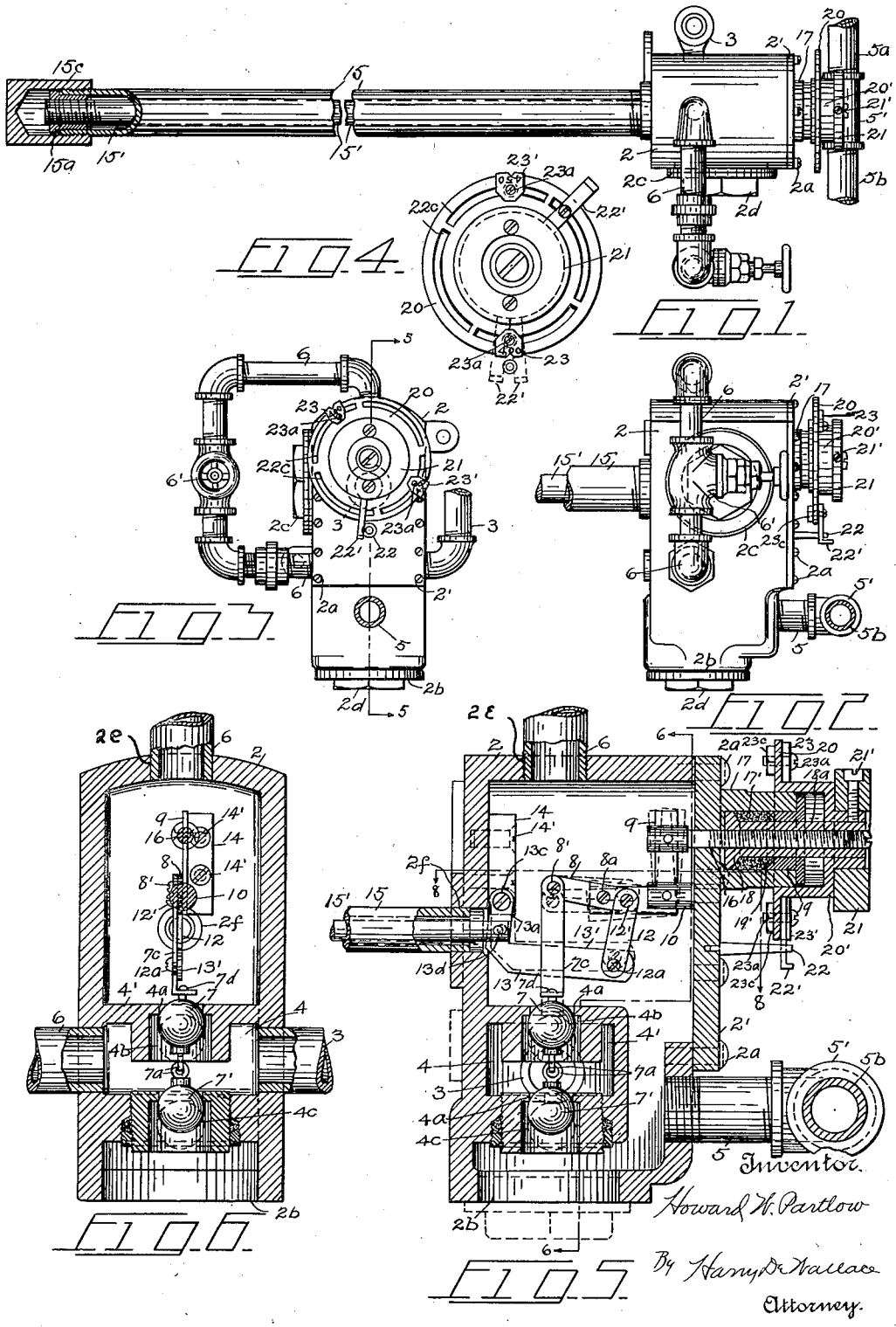
Inventor.
Howard W. Partlow
By Harry D. Wallace
Attorney.

April 7, 1925.
H. W. PARTLOW
1,532,340
HEAT CONTROL FOR INDUSTRIAL OVENS
Filed June 14, 1924　　2 Sheets-Sheet 2
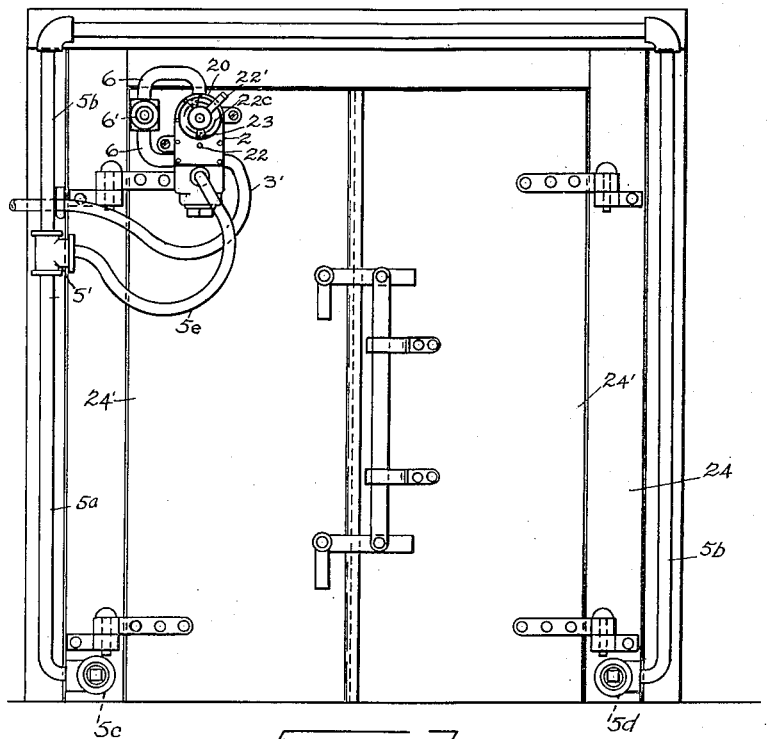
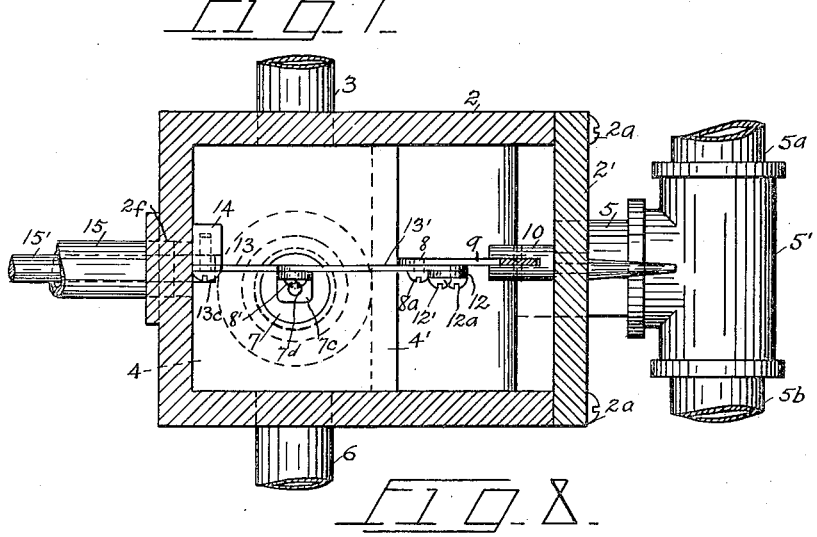

Patented Apr. 7, 1925.

1,532,340

UNITED STATES PATENT OFFICE.

HOWARD W. PARTLOW, OF UTICA, NEW YORK.

HEAT CONTROL FOR INDUSTRIAL OVENS.

Application filed June 14, 1924. Serial No. 720,116.

*To all whom it may concern:*

Be it known that I, HOWARD W. PARTLOW, a citizen of the United States, residing at Utica, in the county of Oneida and State of New York, have invented certain new and useful Improvements in Heat Controls for Industrial Ovens, of which the following is a specification.

This invention relates to improvements in thermostatic governors, for controlling the heat of industrial and other ovens, including annealing, enameling, tempering and corebaking ovens, wherein the heat is produced by either atmospheric or high-pressure gasburners.

The object of the invention is to provide novel, simple and sensitive means for maintaining the proper degree of heat, for effecting the baking and curing of the products of the ovens. A further object is to provide a series of valves, preferably of the balanced type, which are connected for simultaneous operation, and which are especially adapted for controlling the fuel-gas, when the latter is consumed at pressures above the ordinary commercial pressure. A further object is to provide a novel mechanism for opening and closing the said valves; the said mechanism being capable of controlling a relatively wide range of temperatures in ovens, and the like, and being arranged for adjusting and setting the said valves and certain related parts, for accurately predetermining different degrees of temperature. A further object is to provide a thermally actuated element, which is operatively connected with the valve operating and adjusting mechanisms, and which may be disposed in a hot zone of the oven, for automatically controlling the said valves. And a further object is to provide a combined mechanical and thermostatic heat control which effectually obviates excessive heating, as well as waste of the fuel.

The various features and parts of the invention will be understood from the detailed description which follows, and by reference to the accompanying drawings, in which—

Figure 1 is a reduced top-plan view of the complete governor, embodying my improvement. Fig. 2 is a front side elevation of the same. Fig. 3 is a front end elevation of the device. Fig. 4 is an enlarged front face view of the indicating dial. Fig. 5 is a vertical longitudinal section, taken on line 5—5 of Fig. 3. Fig. 6 is a vertical cross-section, taken on line 6—6 of Fig. 5. Fig. 7 is a front elevation of an oven, to which my governor is applied. And Fig. 8 is a horizontal section, taken on line 8—8 of Fig. 5.

In the drawing, 2 represents a hollow body, adapted to be mounted on an oven, as shown in Fig. 7, the said body having a normally open end, which is closed and sealed by a removable cap 2', which is held in place by screws 2ª, and having a bottom opening 2ᵇ, and a side opening 2ᶜ, for affording access to the interior, for assembling and inspection; the latter openings being closed by screw plugs 2ᵈ. The body 2 directly controls the supply of fuel gas to the oven burners, and for this purpose, said body is charged with the pressure by means of a pipe 3, which is screwed into the rear side of the body, and discharges the gas into a relatively small inner chamber 4, which is preferably formed by an integral wall 4', and from which the gas is fed to the burners of the oven by a pipe 5, that taps the lower end-portion of the body, as best seen in Fig. 5. The outer end of pipe 5 is provided with a T 5', to which pipes 5ª—5ᵇ connect, for carrying the fuel gas in different directions towards separate burners simultaneously. The chamber 4 is also tapped by a pipe 6, which with a cock 6', forms a by-pass adapted to supply a small volume of the gas, for preventing the extinguishment of the burners 5ᶜ—5ᵈ, during the intervals between the periodical firings. The pipe 6 is composite, consisting of several nipples and elbows, which discharges the gas into the top of the casing 2, through an opening 2ᵉ, to be carried to the burners by the pipes 5ª—5ᵇ. The fuel gas for heating the oven is supplied intermittently, accordingly as the temperature of the oven fluctuates, by means of twin valves 7—7', the latter preferably being spherical, and being flexibly connected, by means of loosely arranged links 7ª, which permit independent movement and adjustment of the valves relatively to each other, as well as to their seats 4ª. The seats 4ª are both disposed at the tops of individual outlet passages 4ᵇ—4ᶜ, which communicate with the interior of the casing 2, in which the balls 7—7' play vertically; the said seats alining axially and being so arranged that the gas exerts its pressure for seating the uppermost ball 7 and for unseating the lowermost ball 7' simultaneously, thereby effecting the balancing effect, which is desirable, when the gas is burned under considerable pressure during intensive heating. The valves 7—7' are raised towards their seats by a link 7ᶜ, whose lower end is swiveled to the valve 7, by a pin 7ᵈ. The top end of link 7ᶜ is pivoted to the rear-end of a link 8, by a screw 8', the latter link being pivoted intermediate its ends, by a screw 8ª, to the horizontal arm of a bell-crank 9, which in turn is pivoted to a forked stud 10 carried by the cap 2'. The forward end of the link 8 is pivoted to the top end of a similar link 12, by a screw 12', while the bottom end of the latter link is pivoted, by a screw 12ª, to the horizontal arm 13' of a bell crank 13. The vertical arm 13ª of the latter crank is pivoted by a screw 13ᶜ, to a block 14, which is rigidly secured to the inner wall of the casing 2, adjacent a threaded opening 2ᶠ. The thermostat that controls the temperature of the oven is in two parts, and comprises a relatively long expansible tube 15, which is preferably screwed into the threaded opening 2ᶠ of the body 2 in registry with the bell-crank 13. The second member of the thermostat comprises a solid rod 15', preferably of very low, or no expansibility, that loosely telescopes the tube 15, and has its near end pivoted to the bell-crank 13, by a pin 13ᵈ, for directly operating said crank, by the expansive and contractive movements of the tube 15. The remote end of the rod 15' is threaded and adjustably connected with a threaded bushing 15ª, which telescopes the corresponding end of the tube 15; the latter end being closed and protected by a screw cap 15ᶜ. By threading the rod 15' into the bushing 15ª, said rod may be readily and finely adjusted relatively to the bell-crank 13, for accurately and sensitively controlling the valves 7—7'.

The vertical arm of the bell-crank 9 is pivoted in the forked head of a screw or worm 16, which passes through the cap 2' and projects into the casing 2 above the stud 10. The threaded portion of the screw 16 extends outwardly through a hollow boss 17, which is preferably an integral part of the cap 2'. The screw 16 is reciprocated by means of an elongated nut 18, whose enlarged inner end or head seats against the bottom of the cavity 17' of the boss, while the stem 18ª of said nut extends outwardly through and is supported by a bushing 19. The bushing 19 together with the boss 17 and a packing 19' constitute a stuffing-box, for preventing escape of the gas from the body around the screw 16.

20 represents a dial comprising a relatively large circular flange, that surrounds a bell-shaped sleeve 20', which is rotatably supported by the boss 17. The contracted outer end of the sleeve receives the stem 18ª of the nut, and upon this reduced portion is mounted a disc or knob, by which the dial is manually rotated, for rocking the bell-crank 9. The disc 21 is rigidly secured to the stem 18ª by a screw 21'. The threads of the screw 16 and the nut 18 are preferably of relatively steep pitch, so that the adjustment of the dial 20, for predetermining temperatures within a relatively wide range may be effected by a single revolution of the dial and nut 18. In order to limit the revoluble action of the dial, I provide a stop pin 22, which is supported by the cap 2', parallel to the axis of the dial, and the dial is fitted with a radial arm 22', which contacts with the pin 22, for stopping the dial, when the latter rotates in either direction a full turn, as shown in Fig. 4. The dial is formed with an interrupted concentric slot 20ᶜ, for facilitating applying adjustable temperature indicating tags or plates 23—23', upon which may be stamped numbers indicating maximum and minimum degrees of temperature the device is intended to control, as indicated in Figs. 3 and 4. The tags 23—23' are held in place by screws 23ª, which pass through the tags and the slot 20ᶜ, and are detachably secured by nuts 23ᶜ (see Figs. 2 and 5).

The valve controlling mechanism comprising the links 7ᶜ and 8, bell-crank 9, link 12 and bell-crank 13, may be operated either by hand-knob 21 and screw 16, or by the thermostat 15—15', for opening and closing the valves 7—7'. The full lines in Fig. 5 show the normal position of the bell-crank 9, which is directly controlled by the hand-knob 21. The dotted lines in the same view, show the operation of the said crank, for predetermining higher or lower than normal temperatures. If the bell-crank 9 is tilted by the inward movement of the screw 16, when the valves 7—7' are open (see dotted lines in Fig. 5), and the bell-crank 13 is held stationary in either of the positions shown in Fig. 5, the crank 9 will rock the link 8 on the pivot 8ª in the direction for lifting the link 7ᶜ, and the valves upwardly towards their seats. By this arrangement, the valves may be adjusted relatively to their seats in advance of a heating period, or during the said period, for limiting the ultimate control of the valves by the thermostat 15—15', through the crank 13, and thus predetermine the range of temperature of an oven or other thing that is being governed. For example: Assuming that the valves 7—7' are open, as shown by the dotted lines in Fig. 5, and are yielding a temperature of 450° F., by reason of a prior adjustment, and it is desired to reduce the maximum temperature to 400°, the operator should first turn the knob 21 and the dial in the direction for bringing the indicating tag 23 into registry with the pin 22. This rocks the bell-crank 9 towards the left for tilting the near end of the link 8 downwardly and the opposite end upwardly, and correspondingly raises the valves 7—7' towards their seats, but does not seat them. If the burners of the oven are already lighted, they will continue to burn until the temperature in the oven raises to the predetermined degree (400°) and effects the relative expansion of the thermostat 15. This lengthening of the element 15, causes the rod 15' to pull the vertical arm of the crank 13 outwardly, and lowers its horizontal arm, which pulls downwardly on the link 12, and rocks link 8 in the direction for seating the valves 7—7' and shutting off the flow of the fuel gas. When the temperature of the oven falls a degree or so, the thermostat correspondingly contracts, and reverses the movements of the several parts referred to, and opens the valves, for allowing fresh fuel to pass from chamber 4 to the burners, for again raising the temperature in the oven to the predetermined maximum, and so on. On the other hand, if the oven has been operating at a maximum temperature of 400°, as indicated by the position of the tag 23 in Fig. 4, and it is desired to increase the maximum to say, 450°, the operator may rotate the dial 20 in the direction for bringing the tag 23' into registry with the pin 22. This will effect the tilting of the crank 9 in the opposite direction, and rock link 8 and link 7ᶜ in the direction for lowering the valves 7—7' still farther from their seats. This latter adjustment will cause the burners to operate at full blast a longer interval, to raise the temperature of the oven 50°, and require the thermostats to expand to a greater extent, in order to seat the valves 7—7' and shut down the burners, when the new maximum temperature (450°) is reached. In either case described, the valves 7—7' will be closed when the maximum heat indicated by the indicating dial has been produced. It is obvious that the valves 7—7' may be closed by the manipulation of the dial 20; or said valves may be closed by the expansion of the thermostats, provided the firing of the burners is continued for a long enough period and the heat evolved by the burners is sufficient to effect the required expansion of the members 15—15', as described.

Fig. 7 represents conventionally a baking oven 24, which is heated by the burners 5ᶜ—5ᵈ, which are shown located at the opposite lower sides of the oven, and connect respectively with the modified gas-supply pipes 5ᵃ—5ᵇ. The governor is preferably mounted on one of the doors, as 24', and the thermostat is accordingly close to the top, or the hottest zone of the oven. The governor is shown equipped with flexible gas tubes 3' and 5ᵉ, which permit the door 24' to be swung open, without interfering with or injuring the connections. The governor may be disposed in any other suitable position.

Having thus described my invention, what I claim, is—

1. A heat governor, comprising a hollow body adapted to be charged with fuel gas to be delivered to burners for producing the heat, a primary gas receiving chamber within said body, a thermostat supported by one end of the body adapted to be inserted in the zone of the heat evolved by the burners, a mechanism for predetermining maximum and minimum degrees of heat to be controlled by the thermostat, located at the opposite end of the body, a pair of valves in said receiving chamber, said valves being flexibly and adjustably connected and being arranged for simultaneous operation for controlling the outflow of the fuel gas towards the burners, and a series of connected links interposed between and operatively connecting said thermostat and said predetermining mechanism with each other and with said valves.

2. A heat governor, comprising a hollow body adapted to be charged with fuel gas to be delivered to burners for producing the heat, a gas receiving chamber located within the hollow body, a thermostat supported by said body adapted to be inserted in a zone of the heat evolved by burning said gas, an indicating dial for predetermining maximum and minimum degrees of heat controlled by said thermostat mounted on said body, a pair of flexibly connected valves arranged for operation as one part disposed in the gas receiving chamber adapted for dispensing the fuel gas during the heating periods, a bell-crank operatively connected with said dial, a bell-crank connected to the thermostat, and a series of pivotally connected links operatively connecting said bell-cranks with each other and with said valves, whereby said thermostat, as well as said dial may jointly and independently effect the opening and closing movements of the valves.

3. The combination with an oven and burners for heating the oven, of a heat governor adapted to be mounted on the oven having a hollow body for containing fuel gas, and having a gas chamber communicating with its interior by separate ports, a pair of flexibly connected valves in said chamber adapted to control the flow of the gas from said chamber into said body, means for adjusting said valves relatively to each other and to their seats, means for conducting the fuel gas from the body to said burners, a thermostat carried by said body adapted to be inserted in the oven and to expand and contract for positively controlling the opening and closing of said valves, a mechanism including a bell crank for predetermining the range of the opening and closing movements of said valves, and a series of pivotally connected links operatively connecting said thermostat and said mechanism with said valves.

4. A governor for controlling the temperatures of ovens and the like, including a hollow body adapted to be charged with fuel gas, said body having a separate chamber that receives the gas from its source of supply, said chamber communicating with the interior of the body by several ports, a valve for controlling each port, said valves being flexibly connected for simultaneous operation, means for adjusting said valves for predetermining the range of the opening and closing movements thereof, and a thermostatic element associated with said body arranged to be inserted in the hottest zone of the oven adapted to effect the opening and closing of said valves to the extent limited by said predetermining means.

5. A governor for controlling the temperature of ovens and the like, including a hollow body adapted to be charged with fuel-gas to be supplied to the burners of the oven, said body having an inner chamber that receives the fuel-gas from its source, said chamber communicating with the interior of the body by a series of ports, a valve for controlling each port, adjustable means connecting said valves for operation as one part, an indicating dial adapted for predetermining maximum and minimum degrees of heat in the oven, a bell-crank operatively connecting said dial with said valves, a thermostat carried by said body arranged to be inserted in heated portions of the oven, a bell-crank operatively connecting the thermostat with said valves adapted to open and close the valves when the temperature in the oven reaches the minimum and maximum degrees indicated by said dial, and means interposed between said bell-cranks common to said dial, said thermostat and said valves for facilitating independent manual and thermal operation of the valves.

6. A heat controlling device comprising a hollow body adapted to supply gas at high pressure for heating ovens and the like, said body having an inner chamber adapted to receive the gas from its source, and communicating with the interior of the body by means of alining ports, a pair of valves in said chamber for dispensing the gas via said ports, said valves being flexibly connected and operable simultaneously, a thermostat arranged to be inserted in an oven and adapted to control said valves to a limited extent by its expansion and contraction, means for predetermining and indicating various temperatures to be controlled by said thermostat, and means actuated by the indicating mechanism for limiting the opening and closing movemens of said valves by said thermostat.

7. A heat controlling device for ovens, comprising a hollow body adapted to be charged with fuel gas at high pressure for heating the oven, said body having an inner chamber communicating with the interior by alining ports, a pair of valves in said chamber for dispensing the gas via said ports, the said valves being flexibly and adjustably connected as one part, means for predetermining and indicating the range of heat in the oven, a bell-crank operatively connected with said dial, a thermostat carried by said body adapted to be inserted in a hot zone of the oven and adapted to control said valves to the extent limited by said predetermining means, a bell-crank operatively connected to said thermostat, and a series of links connecting said valves with both of said bell-cranks, whereby said dial and said thermostat may jointly effect the maximum movements of said valves.

8. In a heat control for ovens, a hollow body adapted to be charged with fuel gas for supplying the burners of the oven, flexibly connected valves in said body for controlling the flow of the gas to the burners, an indicating mechanism for predetermining the range of temperature in the oven, a bell-crank operatively connected with said mechanism, a thermostatic element carried by said body adapted to be inserted in a hot zone of the oven, a bell-crank operatively connected to said element, and a series of links connecting said valves with both of said bell-cranks, whereby said mechanism and said element jointly effect the maximum movements of said valves for controlling the heat of the oven.

9. In a heat control for industrial ovens, the combination with an oven and separate burners for heating the oven, of a hollow body adapted to be charged with fuel-gas to be supplied to the burners, said body having an inner chamber communicating with the interior of the body by means of alining ports, flexibly connected valves disposed in said chamber adapted to dispense the fuel gas via said ports, means for adjusting said valves relatively to each other and to their seats, a rotary indicating dial mounted on said body adapted for predetermining the range of temperature in the oven, a series of links operatively connected with said valves, adjustable means connecting said links with said dial, a thermostat supported by said body arranged to be inserted in the hottest portion of the oven adapted to expand and contract by the rise and fall of the temperature in said oven, a rockable part operatively connecting said thermostat with said links, and a by-pass tapping said chamber adapted to provide small quantities of gas to said body when said valves are closed.

In testimony whereof I affix my signature.

HOWARD W. PARTLOW.